United States Patent
Okamoto et al.

(10) Patent No.: US 7,728,480 B2
(45) Date of Patent: Jun. 1, 2010

(54) DYNAMOELECTRIC MACHINE

(75) Inventors: Shogo Okamoto, Chiyoda-ku (JP);
Hiroya Ikuta, Chiyoda-ku (JP);
Yoshihiro Harada, Chiyoda-ku (JP);
Naohiko Harada, Chiyoda-ku (JP);
Kensaku Kuroki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 287 days.

(21) Appl. No.: 11/783,774

(22) Filed: Apr. 12, 2007

(65) Prior Publication Data

US 2008/0088197 A1    Apr. 17, 2008

(30) Foreign Application Priority Data

Oct. 13, 2006    (JP) ............... 2006-279873

(51) Int. Cl.
*H02K 1/12*    (2006.01)
(52) U.S. Cl. .............. 310/216.004; 310/216.008; 310/216.136
(58) Field of Classification Search .......... 310/216.004, 310/216.008, 216.009, 113, 136; *H02K 1/12*
See application file for complete search history.

(56) References Cited

U.S. PATENT DOCUMENTS

| | | | |
|---|---|---|---|
| 5,359,763 A * | 11/1994 | Neuenschwander | 29/738 |
| 6,337,529 B1 * | 1/2002 | Higashino et al. | 310/216.008 |
| 7,260,880 B2 * | 8/2007 | Harada et al. | 29/596 |
| 7,260,881 B2 * | 8/2007 | Harada et al. | 29/596 |
| 2002/0140315 A1 * | 10/2002 | Harada et al. | 310/254 |
| 2006/0001328 A1 | 1/2006 | Rau et al. | |

FOREIGN PATENT DOCUMENTS

| | | |
|---|---|---|
| JP | 52-017603 | 2/1977 |
| JP | 07-059292 A | 3/1995 |
| JP | 2000-278892 A | 10/2000 |
| JP | 2001-211619 | 8/2001 |
| JP | 2002-291184 A | 10/2002 |
| JP | 2005-539478 A | 12/2005 |
| JP | 2006515144 | 5/2006 |
| WO | 2004-030184 A1 | 4/2004 |
| WO | 2005064765 A1 | 7/2005 |

OTHER PUBLICATIONS

India Patent Office Communication dated Sep. 10, 2009.
Japanese Communication dated Feb. 23, 2010.

* cited by examiner

*Primary Examiner*—Quyen Leung
*Assistant Examiner*—Naishadh N Desai
(74) *Attorney, Agent, or Firm*—Sughrue Mion, PLLC (57) ABSTRACT

The stator core is configured into a cylindrical shape by abutting a laminated core that is obtained by bending and forming a rectangular parallelepiped lamination and integrating the stator core by welding. The lamination is configured by laminating a predetermined number of thin strip-shaped magnetic plates that are formed so as to have a flat rectangular shape, and in addition at least two thin sheet coupling weld portions that integrate the predetermined number of thin strip-shaped magnetic plates by welding are formed so as to extend from a first end to a second end in a direction of lamination on an outer wall surface of the lamination and so as to have a predetermined spacing in a longitudinal direction of the lamination. The stator core is formed such that an axial length A at the thin sheet coupling weld portions and a maximum axial length B between the thin sheet coupling weld portions satisfy an expression: $0.0 \text{ mm} \leqq B \cdot A \leqq 0.2 \text{ mm}$.

4 Claims, 6 Drawing Sheets

DYNAMOELECTRIC MACHINE

BACKGROUND OF THE INVENTION

1. Field of the Invention

The present invention relates to a dynamoelectric machine such as an automotive alternator, etc., and particularly relates to a construction that improves cooling of a stator.

2. Description of the Related Art

In conventional automotive alternators, a rectangular parallelepiped lamination is prepared by laminating a predetermined number of thin strip-shaped magnetic plates such that teeth are superposed. Then, laser welding is applied to the lamination to form thin sheet coupling weld portions on outer wall surfaces of a core back at positions that divide a longitudinal direction of the lamination into four equal parts, for example, such that each extends from a first end portion to a second end portion in a direction of lamination. Next, a laminated core is prepared by bending the welded lamination into an arc shape, a fan shape, or a cylindrical shape with the teeth facing inward. Then, a cylindrical stator core is prepared by abutting end surfaces of a single laminated core or a plurality of laminated cores and welding the abutted portions thereof (see Patent Literature 1, for example).

Patent Literature 1: Japanese Patent Laid-Open No. 2002-291184 (Gazette)

A stator is mounted to a case such that a plurality of circumferential positions on two axial end surfaces of the stator core are pressed and held from two axial ends between opening edge portions of a front bracket and a rear bracket that are bowl-shaped, made of aluminum, and constitute the case. Thus, hill-shaped bulges between the thin sheet coupling weld portions of the stator core are not flattened completely, and the stator core is in a state in which circumferential portions of the end surfaces are in partial contact with the case with air interposed between the thin strip-shaped magnetic plates. Thus, one problem has been that thermal conduction from the stator core to the case deteriorates significantly, preventing effective cooling of the stator.

Moreover, it is conceivable that the number of thin sheet coupling weld portions could be increased or that thickness of the thin strip-shaped magnetic plates at the two axial ends, where the amount of deformation is greatest, could be increased as countermeasures to suppress the occurrence of gaps between adjacent thin strip-shaped magnetic plates between the thin sheet coupling weld portions. However, increasing the number of the thin sheet coupling weld portions increases costs. It is also not possible to increase the thickness of the thin magnetic plates very much if consideration is given to core loss.

SUMMARY OF THE INVENTION

The present invention aims to solve the above problems and an object of the present invention is to provide a dynamoelectric machine that enables a stator to be cooled effectively by suppressing hill-shaped bulges between thin sheet coupling weld portions of a stator core to expand contact area with a bracket, to reduce interposition of air between thin magnetic plates, and also to increase thermal conduction from the stator core to the bracket.

In order to achieve the above object, according to one aspect of the present invention, there is provided a dynamoelectric machine including: first and second brackets that are each formed so as to have a bowl shape and that are disposed such that openings face each other; a shaft that is rotatably supported at central axial positions of the first and second brackets; a rotor that is fixed to the shaft so as to be rotatably disposed inside the first and second brackets; and a stator that has: a cylindrical stator core in which slots are arrayed circumferentially so as to be open on an inner circumferential side and that is disposed such that two axial end edge portions are pressed and held between opening edge portions of the first and second brackets so as to surround the rotor; and a stator coil that is wound onto the stator core. The stator core is configured into a cylindrical shape by abutting end surfaces of a laminated core with each other and integrating the abutted end surfaces by welding, and the laminated core is configured by laminating a predetermined number of thin magnetic plates, and at least two thin sheet coupling weld portions that integrate the laminated predetermined number of thin magnetic plates by welding are formed so as to extend from a first end to a second end in a direction of lamination on an outer wall surface of the laminated core and so as to have a predetermined spacing. In addition, the stator core is formed such that an axial length A at the thin sheet coupling weld portions and a maximum axial length B between the thin sheet coupling weld portions satisfy an expression: $0.0 \text{ mm} \leq B - A \leq 0.2 \text{ mm}$.

According to the present invention, because adjacent thin magnetic plates are placed in close contact, interposition of air between the thin magnetic plates is reduced, improving thermal conductivity inside the stator core. In addition, contact area between the bracket and the stator core is enlarged, improving thermal conductivity from the stator core to the bracket. Thus, because heat that is generated by the stator coil is efficiently transferred through the stator core to the bracket and is radiated from the bracket, stator temperature increases are suppressed.

DETAILED DESCRIPTION OF THE PREFERRED EMBODIMENTS

Embodiment 1

Figure 1:
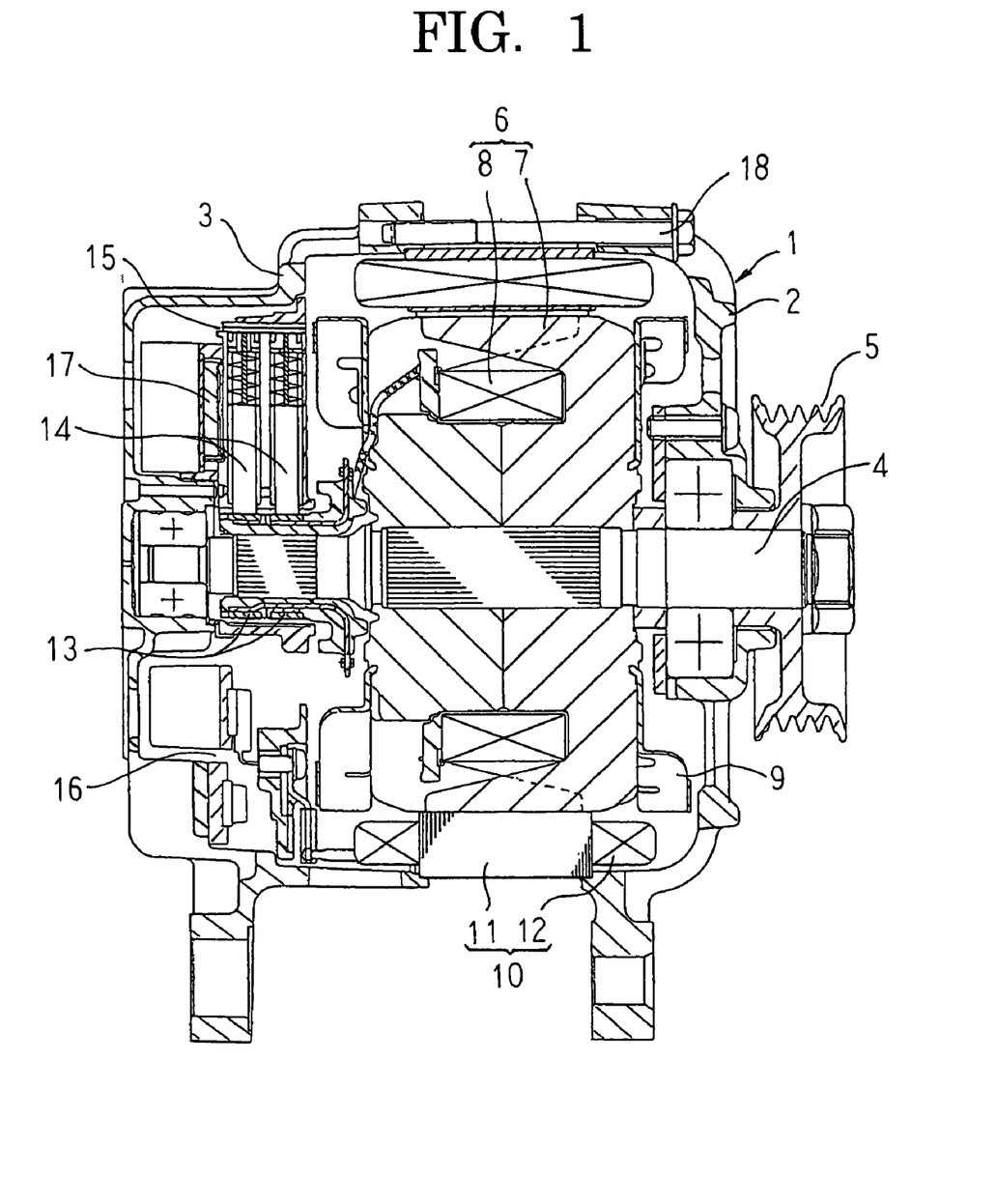
FIG. 1 is a cross section of an automotive alternator according to Embodiment 1 of the present invention.
Figure 2:
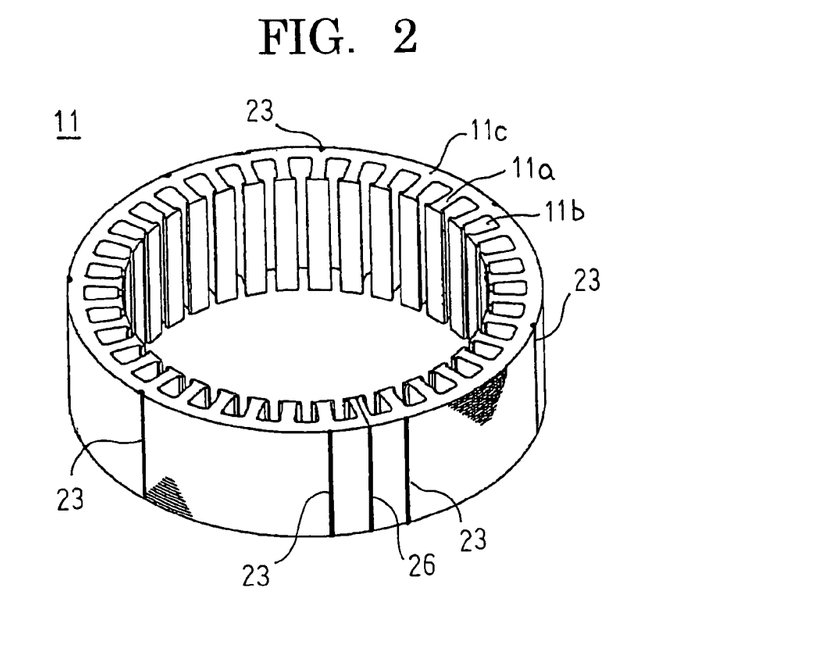
FIG. 2 is a perspective of a stator core that can be used in the automotive alternator according to Embodiment 1 of the present invention.
Figure 3:
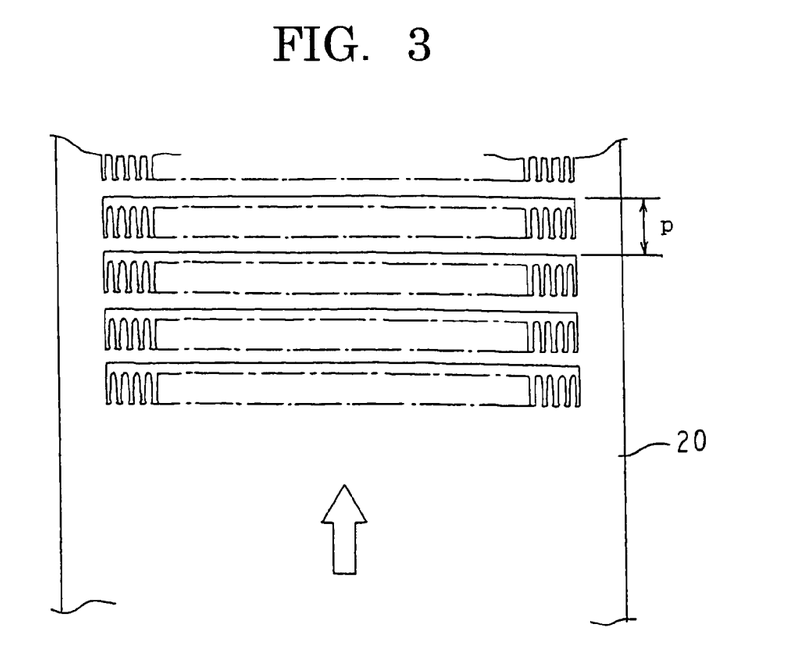
FIG. 3 is a diagram that explains a process of punching thin strip-shaped magnetic plates that constitute the stator core that can be used in the automotive alternator according to Embodiment 1 of the present invention.
Figure 4:
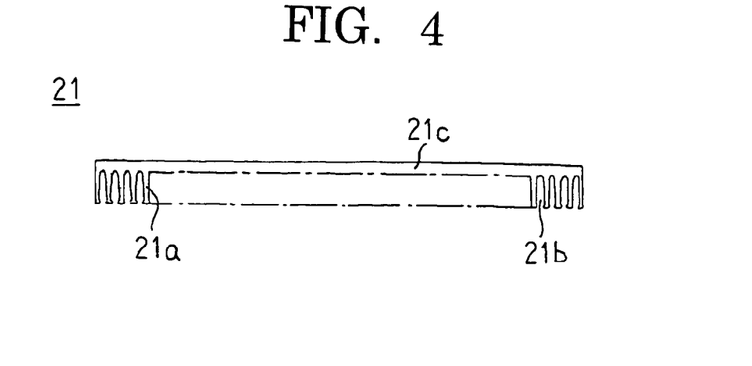
FIG. 4 is a plan of a thin strip-shaped magnetic plate that constitutes the stator core that can be used in the automotive alternator according to Embodiment 1 of the present invention.
Figure 5:
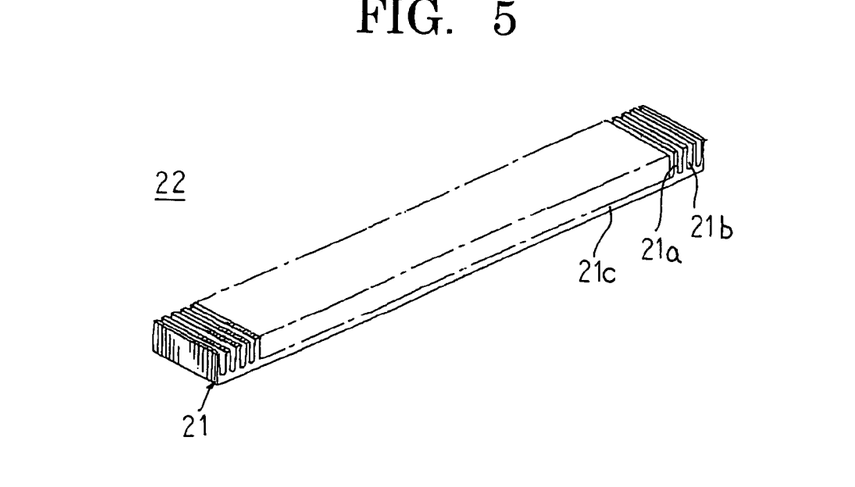
FIG. 5 is a perspective that is viewed from a slot side of a lamination of thin strip-shaped magnetic plates that is obtained in a process of manufacturing the stator core that can be used in the automotive alternator according to Embodiment 1 of the present invention.
Figure 6:
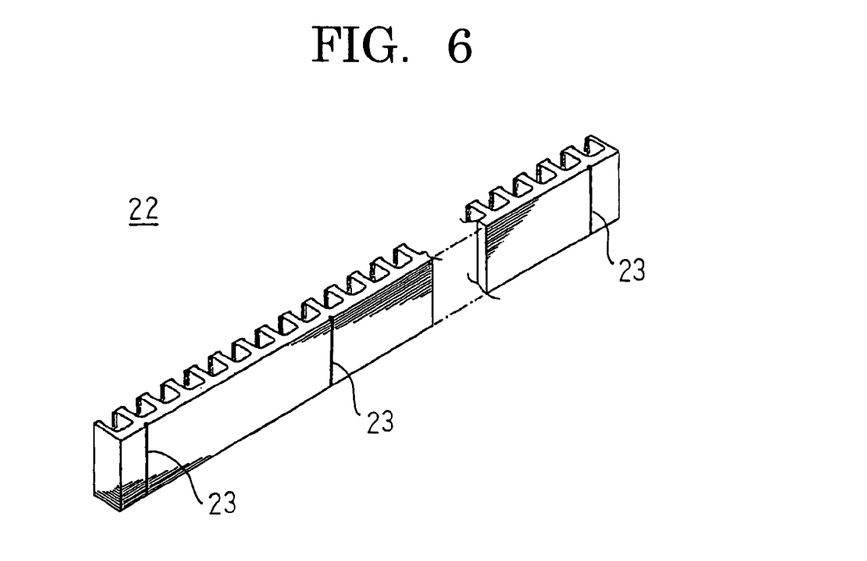
FIG. 6 is a perspective that is viewed from a core back side of the lamination of thin strip-shaped magnetic plates that is obtained in the process of manufacturing the stator core that can be used in the automotive alternator according to Embodiment 1 of the present invention.
Figure 7:
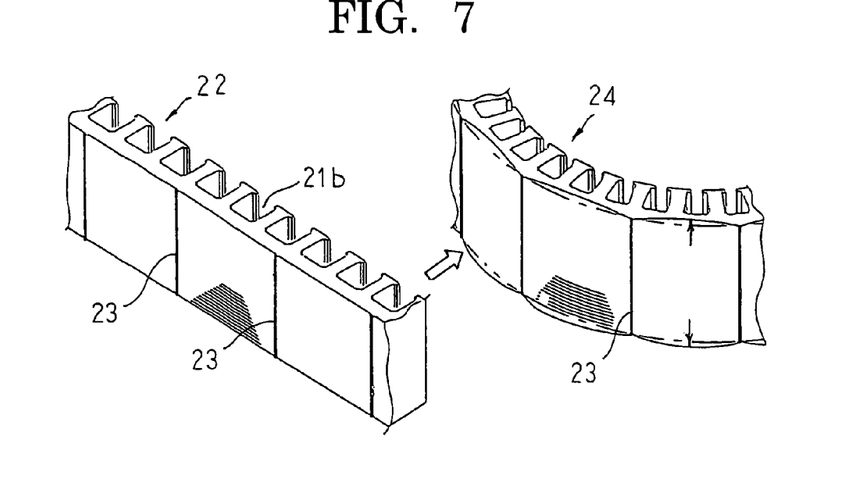
FIG. 7 is a diagram that explains a process of bending the lamination in the method for manufacturing the stator core that can be used in the automotive alternator according to Embodiment 1 of the present invention.
Figure 8:
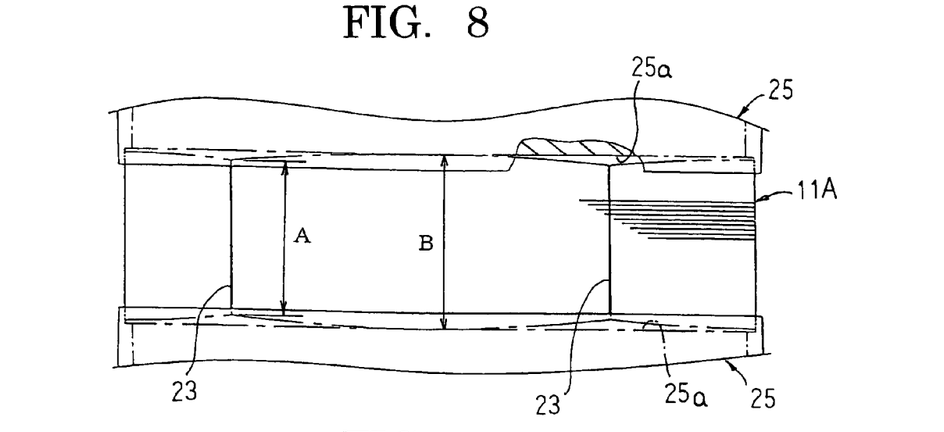
FIG. 8 is a diagram that explains a state before a pressing process in the method for manufacturing the stator core that can be used in the automotive alternator according to Embodiment 1 of the present invention.
Figure 9:
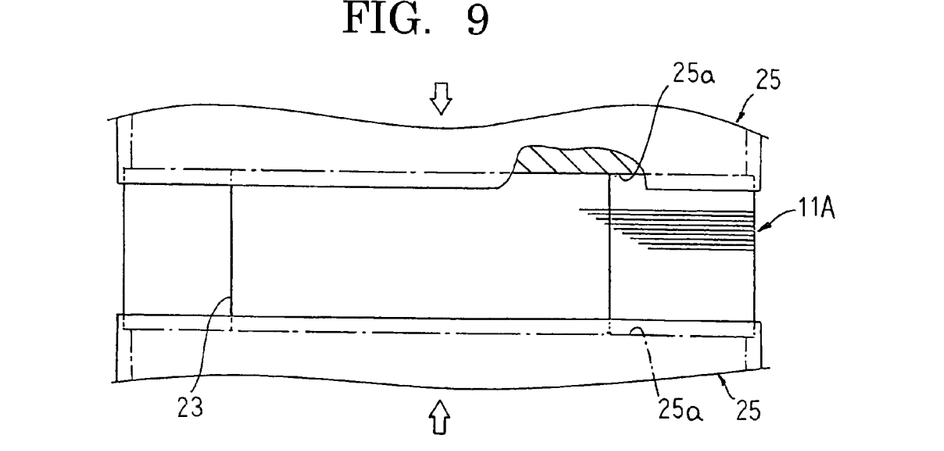
FIG. 9 is a diagram that explains a state after the pressing process in the method for manufacturing the stator core that can be used in the automotive alternator according to Embodiment 1 of the present invention.
Figure 10:
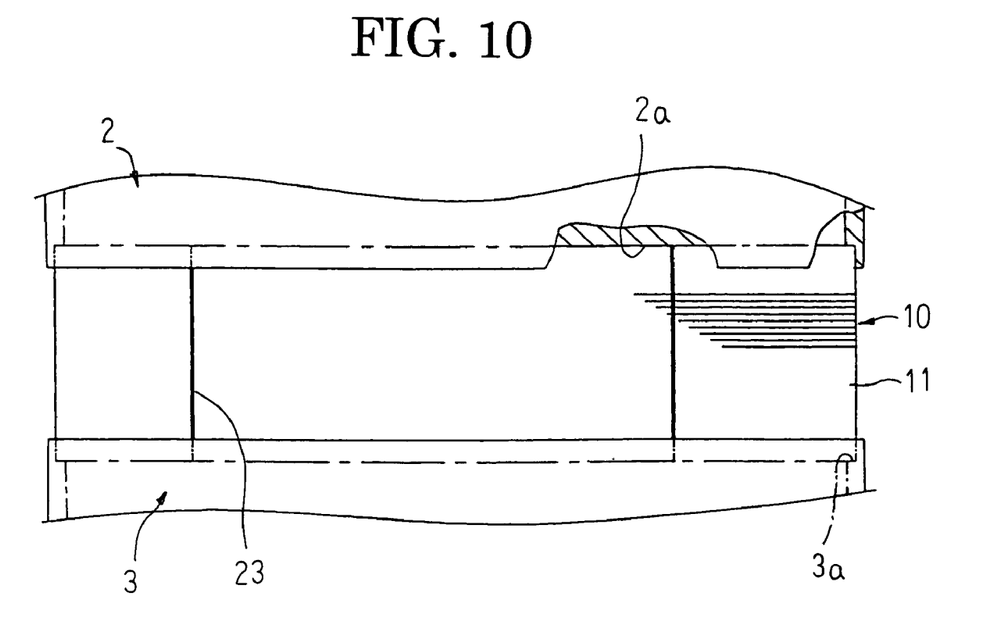
FIG. 10 is an enlarged side elevation of part of the automotive alternator according to Embodiment 1 of the present invention.

FIG. 1 is a cross section of an automotive alternator according to Embodiment 1 of the present invention, FIG. 2 is a perspective of a stator core that can be used in the automotive alternator according to Embodiment 1 of the present invention, FIG. 3 is a diagram that explains a process of punching thin strip-shaped magnetic plates that constitute the stator core that can be used in the automotive alternator according to Embodiment 1 of the present invention, FIG. 4 is a plan of a thin strip-shaped magnetic plate that constitutes the stator core that can be used in the automotive alternator according to Embodiment 1 of the present invention, FIG. 5 is a perspective that is viewed from a slot side of a lamination of thin strip-shaped magnetic plates that is obtained in a process of manufacturing the stator core that can be used in the automotive alternator according to Embodiment 1 of the present invention, FIG. 6 is a perspective that is viewed from a core back side of the lamination of thin strip-shaped magnetic plates that is obtained in the process of manufacturing the stator core that can be used in the automotive alternator according to Embodiment 1 of the present invention, FIG. 7 is a diagram that explains a process of bending the lamination in the method for manufacturing the stator core that can be used in the automotive alternator according to Embodiment 1 of the present invention, FIG. 8 is a diagram that explains a state before a pressing process in the method for manufacturing the stator core that can be used in the automotive alternator according to Embodiment 1 of the present invention, FIG. 9 is a diagram that explains a state after the pressing process in the method for manufacturing the stator core that can be used in the automotive alternator according to Embodiment 1 of the present invention, and FIG. 10 is an enlarged side elevation of part of the automotive alternator according to Embodiment 1 of the present invention.

In FIGS. 1 and 2, an automotive alternator that functions as a dynamoelectric machine includes: a case 1 that is constituted by a front bracket 2 that functions as a first bracket and a rear bracket 3 that functions as a second bracket that are each approximately bowl-shaped and made of aluminum; a shaft 4 that is rotatably supported by the case 1; a pulley 5 that is fixed to an end portion of the shaft 4 that projects outward at a front end of the case 1; a rotor 6 that is fixed to the shaft 4 and accommodated inside the case 1; fans 9 that are fixed to two axial end surfaces of the rotor 6; a stator 10 that is fixed to an inner wall surface of the case 1 so as to surround an outer circumference of the rotor 6; slip rings 13 that are fixed to a rear end of the shaft 4 so as to supply electric current to the rotor 6; a pair of brushes 14 that are disposed inside the case 1 so as to slide on the slip rings 13; a brush holder 15 that houses the brushes 14; a rectifier 16 that is electrically connected to the stator 10 so as to rectify alternating current that is generated in the stator 10 into direct current; and a regulator 17 that adjusts magnitude of an alternating voltage that is generated in the stator 10.

The rotor 6 is constituted by: a field coil 7 that generates magnetic flux on passage of electric current; and a pole core 8 that is disposed so as to cover the field coil 7 and in which magnetic poles are formed by the magnetic flux. The stator 10 includes: a cylindrical stator core 11; and a stator coil 12 that is wound onto stator core 11 and in which an alternating current arises due to changes in the magnetic flux from the field coil 7 that accompany rotation of the rotor 6.

Next, a method for manufacturing the stator core 11 will be explained with reference to FIGS. 2 through 9.

First, as shown in FIG. 3, thin strip-shaped magnetic plates 21 are punched at a pitch p while moving a rolled steel plate 20 in the direction of the arrow. As shown in FIG. 4, the thin strip-shaped magnetic plates 21 have a flat rectangular shape, and tooth portions 21a are formed so as to project outward from a core back portion 21c in a first width direction at a predetermined pitch in a longitudinal direction. Thus, slot portions 21b are formed between the tooth portions 21a so as to be open in the first width direction of the thin strip-shaped magnetic plates 21. Widths of the tooth portions 21a at first and second longitudinal end portions are half the width of other tooth portions 21a. Lengths of the thin strip-shaped magnetic plates 21 match a circumferential length of the stator core 11.

Next, a rectangular parallelepiped lamination 22, shown in FIG. 5, is prepared by laminating the punched thin strip-shaped magnetic plates 21 to a thickness equal to an axial thickness of the stator core 11 with the tooth portions 21a, the slot portions 21b, and the core back portions 21c stacked on top of each other. Next, the laminated thin strip-shaped magnetic plates 21 are integrated by welding outer wall surfaces of the core back portions 21c of the thin strip-shaped magnetic plates 21 from a first end to a second end in a direction of lamination of the lamination 22 at positions that divide a longitudinal direction of the lamination 22 into four equal parts. The laminated thin strip-shaped magnetic plates 21 are also integrated by welding the outer wall surfaces of the core back portions 21c of each of the thin strip-shaped magnetic plates 21 from a first end to a second end of the direction of lamination of the lamination 22 at positions that face second tooth portions 21a from first and second longitudinal ends of the lamination 22. Thus, the laminated thin strip-shaped magnetic plates 21 are integrated by eight thin sheet coupling weld portions 23 to prepare a rectangular parallelepiped lamination 22, as shown in FIG. 6.

Next, a laminated core 24 is obtained by bending the lamination 22 into a cylindrical shape such that the openings of the slot portions 21b face inward, as shown in FIG. 7. As indicated by arrows in FIG. 7, portions of two axial end surfaces of the laminated core 24 between the thin sheet coupling weld portions 23 of the thin strip-shaped magnetic plates 21 rise axially outward due to bending and form a hill shape. Next, a cylindrical stator core 11A is obtained by abutting the two end surfaces of the laminated core 24 and integrating them by welding using laser welding, for example. Here, the array pitch of the thin sheet coupling weld portions 23 is shown in a shortened state in FIG. 7 for convenience in order to make the raised state between the thin sheet coupling weld portions 23 easier to see.

Thereafter, as shown in FIG. 8, the stator core 11A is set between a pair of pressure jigs 25 that are composed of a steel material that have flat, annular pressure surfaces 25a. Next, as indicated by arrows in FIG. 9, pressure is applied to the two axial end surfaces of the stator core 11A using the pressure surfaces 25a of the pair of pressure jigs 25. Thus, a stator core 11 in which the two end surfaces have been flattened, as shown in FIG. 2, is obtained by pressing portions that bulge axially outward at the two end surfaces of the stator core 11A using the pressure surfaces 25a to plastically deform the raised portions of the thin strip-shaped magnetic plates 21. Moreover, in FIG. 2, a core joining weld portion 26 is a weld portion at the abutted portion of the laminated core 24.

In a stator core 11 that is prepared in this manner, tooth portions 21a, slot portions 21b, and core back portions 21c of the thin strip-shaped magnetic plates 21 overlap axially to constitute teeth 11a, slots 11b, and a core back 11c.

The stator coil 12 is prepared by inserting U-shaped conductor segments, for example, into each of the slots 11b and connecting open end portions thereof. Moreover, winding assemblies that constitute the stator coil 12 may also be installed in the lamination 22 and the lamination 22 bent into a cylindrical shape to obtain a laminated core 24. The stator coil 12 may then be prepared by abutting the two end surfaces of the laminated core 24, welding the abutted portion, and then connecting end portions of the winding assemblies.

As shown in FIG. 1, a stator 10 assembled in this manner is disposed so as to surround the rotor 6, and is mounted such that outer circumferential edge portions of the two axial end surfaces of the stator core 11 are held under pressure by the opening edge portions of the front bracket 2 and the rear bracket 3, which are fastened using fastening bolts 18. Here, annular abutting axial end surfaces 2a and 3a are formed on the opening edge portions of the front bracket 2 and the rear bracket 3 so as to have flat surfaces that are parallel to a plane that is perpendicular to a central axis of the shaft 4 and so as to be coaxial with the shaft 4. Thus, as shown in FIG. 10, the abutting axial end surfaces 2a and 3a hold the outer circumferential edge portions of the two axial end surfaces of the stator core 11 under pressure from two axial ends.

Now, before the pressing process by the pair of pressure jigs 25, a difference (B−A) between an axial length A of the stator core 11 at the thin sheet coupling weld portions 23 and an axial length (maximum axial length) B of the stator core 11A at central portions between the thin sheet coupling weld portions 23 was 0.50 mm. After the pressing process by the pair of pressure jigs 25, the difference (B−A) in the stator core 11 had become 0.15 mm due to springback of the thin strip-shaped magnetic plates 21 after pressing. In other words, it was confirmed that axially outward bulging between the thin sheet coupling weld portions 23 could be reduced by the pressing process.

Next, when temperature increases in the stator 10 were measured using unpressed and pressed stator cores 11A and 11, it was confirmed that stator temperature was improved by 15 degrees (approx. 9%) when the pressed stator core 11 was used compared to when the unpressed stator core 11A was used.

Thus, by reducing the axially outward bulging between the thin sheet coupling weld portions 23, adjacent thin strip-shaped magnetic plates 21 are placed in close contact with each other, making layers of air that are interposed between the thin strip-shaped magnetic plates 21 much thinner, thereby improving thermal conductivity between the thin strip-shaped magnetic plates 21. Because the flat abutting axial end surfaces 2a and 3a are formed on the opening edge portions of the front bracket 2 and the rear bracket 3 so as to have an annular shape, the outer circumferential edge portions of the two axial end surfaces of the stator core 11 contact the abutting axial end surfaces 2a and 3a around practically the entire circumference, enlarging contact area between the two. Thus, it can be inferred that temperature increases in the stator 10 were suppressed because heat generated by the stator coil 12 is transferred to the stator core 11, is transferred through the stator core 11 to the axial ends efficiently, is transferred from the abutting axial end surfaces 2a and 3a to the case 1 efficiently, and is radiated from surfaces of the case 1.

Figure 11:
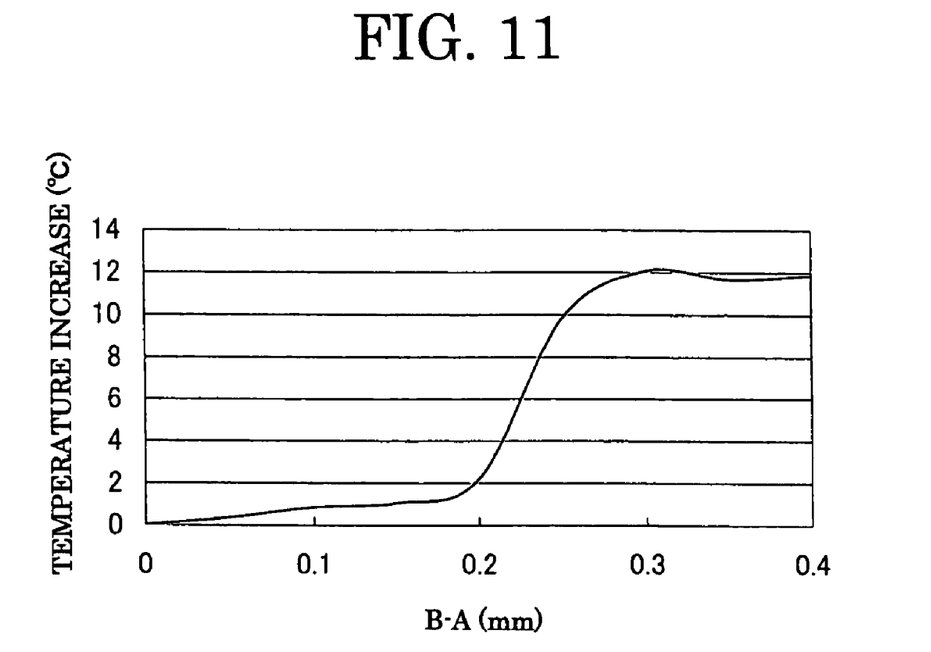
FIG. 11 is a graph that shows a relationship between (B–A) and stator temperature increase in the automotive alternator according to Embodiment 1 of the present invention.

Now, results when stator cores that have different differences (B−A) were prepared and stator temperature increase was measured are shown in FIG. 11.

From FIG. 11, it can be seen that temperature increases were suppressed to less than or equal to 2 degrees Celsius at differences (B−A) up to 0.20 mm. It can also be seen that the temperature rises rapidly if the difference (B−A) exceeds 0.20 mm. In other words, it can be inferred that gaps between the thin strip-shaped magnetic plates 21 are increased if the difference (B−A) exceeds 0.20 mm, making heat transfer poor, and suppression of temperature increases in the stator 10 deteriorates. Thus, it is desirable for the stator core 11 to be prepared such that the difference (B−A) is greater than or equal to 0.00 mm and less than or equal to 0.20 mm.

Thus, according to Embodiment 1, temperature increases in the stator 10 can be suppressed because the difference (B−A) between the axial length A of the stator core 11 at the thin sheet coupling weld portions 23 and the axial length B of the stator core 11A at central portions between the thin sheet coupling weld portions 23 is greater than or equal to 0.00 mm and less than or equal to 0.20 mm. In addition, because adjacent thin strip-shaped magnetic plates 21 are placed in close contact, water, or foreign matter, etc., is less likely to penetrate between the thin strip-shaped magnetic plates 21 from outer circumferential surface portions of the stator core 11 that are exposed through the dynamoelectric machine. Thus, water, foreign matter, etc., is prevented from penetrating between the thin strip-shaped magnetic plates 21 and giving rise to rust, etc., improving fundamental characteristics and also suppressing decreases in output performance.

Because the flat abutting axial end surfaces 2a and 3a are formed on the opening edge portions of the front bracket 2 and the rear bracket 3 so as to have an annular shape, the outer circumferential edge portions of the two axial end surfaces of the stator core 11 are contacted by the abutting axial end surfaces 2a and 3a around the entire circumference, enabling contact area between the two to be enlarged and temperature increases in the stator 10 to be suppressed further.

Moreover, it is not absolutely necessary for the outer circumferential edge portions of both axial end surfaces of the stator core 11 to contact the abutting axial end surfaces of the brackets over the entire circumference provided that the outer circumferential edge portion of at least one axial end surface of the stator core 11 contacts an abutting axial end surface of a bracket over an entire circumference. In that case, a first axial end surface may be constituted by a single annular flat surface, and a second abutting axial end surface may be constructed by arraying a plurality of arc-shaped flat surfaces in an annular pattern so as to have a predetermined spacing, for example.

Embodiment 2

In Embodiment 1 above, the difference (B−A) between the axial length A of the stator core 11 at the thin sheet coupling weld portions 23 and the axial length B of the stator core 11A at central portions between the thin sheet coupling weld portions 23 is greater than or equal to 0.00 mm and less than or equal to 0.20 mm, but in Embodiment 2, the difference (B−A) is greater than or equal to 0.00 mm and less than or equal to (A/100) mm.

Figure 12:
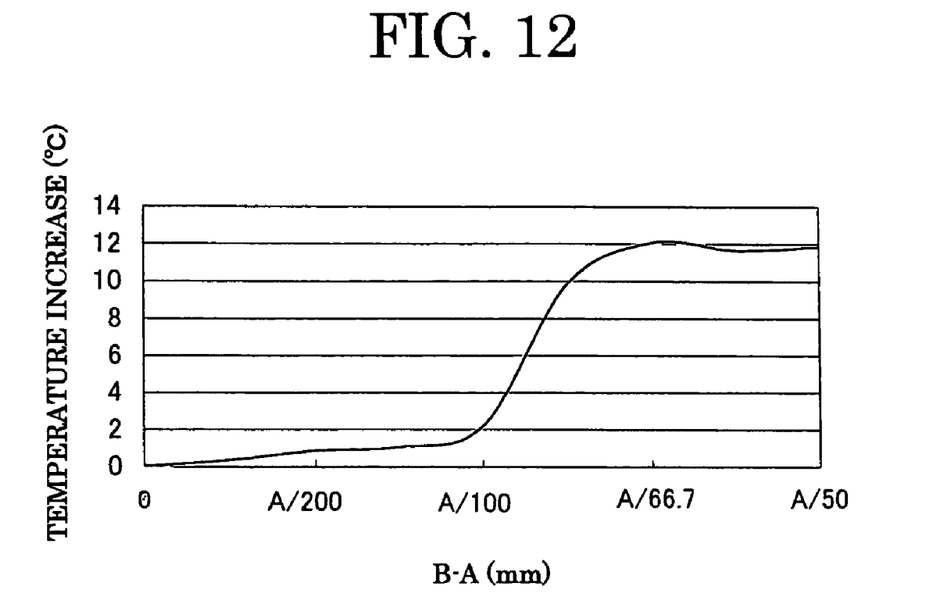
FIG. 12 is a graph that shows a relationship between (B–A) and stator temperature increase in an automotive alternator according to Embodiment 2 of the present invention.

Now, results when stator cores that have different differences (B−A) were prepared and stator temperature increase was measured are shown in FIG. 12.

From FIG. 12, it can be seen that temperature increases were suppressed to less than or equal to 2 degrees Celsius at differences (B−A) up to A/100 mm. It can also be seen that the temperature rises rapidly if the difference (B−A) exceeds A/100 mm. In other words, it can be inferred that gaps between the thin strip-shaped magnetic plates 21 are increased if the difference (B−A) exceeds A/100 mm, making heat transfer poor, and suppression of temperature increases in the stator 10 deteriorates. Thus, it is desirable for the stator core 11 to be prepared such that the difference (B−A) is greater than or equal to 0.00 mm and less than or equal to A/100 mm.

Consequently, similar effects to those in Embodiment 1 above can also be achieved in Embodiment 2.

Moreover, in each of the above embodiments, a stator core 11 is prepared by bending a single lamination 22, but laminations that have lengths that divide the circumferential length of a stator core into n sections (where n is an integer that is greater than or equal to 2) may also be prepared, laminated cores prepared by bending each of the laminations into an arc shape, and a cylindrical stator core prepared by abutting and welding end surfaces of the bent laminated cores. The lengths of each of the laminations may also be made to divide the circumferential length of the stator core into n equal sections.

In each of the above embodiments, the stator core 11 is prepared by preparing a laminated core 24 by bending a rectangular parallelepiped lamination 22 into a cylindrical shape, and integrating it by abutting and welding two end surfaces of the laminated core 24, but a stator core may also be prepared by punching C-shaped thin magnetic plates from a rolled steel plate, preparing a C-shaped laminated core by laminating the punched thin magnetic plates, applying final bending to the C-shaped laminated core, and integrating it by abutting and welding two end surfaces of the laminated core.

In each of the above embodiments, the thin sheet coupling weld portions 23 are formed at positions that divide the lamination 22 into four equal parts in a longitudinal direction thereof, but the spacings and positions of the thin sheet coupling weld portions 23 may be set arbitrarily provided that there are two or more thin sheet coupling weld portions 23.

In each of the above embodiments, an automotive alternator has been explained, but the present invention is not limited to automotive alternators, and similar effects are also exhibited if the present invention is applied to dynamoelectric machines such as automotive alternating-current motors, automotive alternating-current generator-motors, etc.

What is claimed is:

1. A dynamoelectric machine comprising:
   first and second brackets that are each formed so as to have a bowl shape and that are disposed such that openings face each other;
   a shaft that is rotatably supported at central axial positions of said first and second brackets;
   a rotor that is fixed to said shaft so as to be rotatably disposed inside said first and second brackets; and
   a stator comprising:
   a cylindrical stator core in which slots are arrayed circumferentially so as to be open on an inner circumferential side and that is disposed such that two axial end edge portions are pressed and held between opening edge portions of said first and second brackets so as to surround said rotor; and
   a stator coil that is wound onto said stator core,
   wherein:
   said stator core is configured into a cylindrical shape by abutting end surfaces of a laminated core with each other and integrating said abutted end surfaces by welding;
   said laminated core is configured by laminating a predetermined number of thin magnetic plates, at least two thin sheet coupling weld portions that integrate said laminated predetermined number of thin magnetic plates by welding being formed so as to extend from a first end to a second end in a direction of lamination on an outer wall surface of said laminated core and so as to have a predetermined spacing; and
   said stator core is formed by plastically deforming the portions of said magnetic plates between said thin sheet coupling weld portions, such that an axial length A at said thin sheet coupling weld portions and a maximum axial length B between said thin sheet coupling weld portions satisfy an expression:

$0.0 \text{ mm} \leq B-A \leq 0.2 \text{ mm}$.

2. A dynamoelectric machine according to claim 1, wherein said laminated core is formed by bending into a cylindrical shape a rectangular parallelepiped lamination that is configured by laminating a predetermined number of sheets of said thin magnetic plates that are formed so as to have a flat rectangular shape.

3. A dynamoelectric machine comprising:
   first and second brackets that are each formed so as to have a bowl shape and that are disposed such that openings face each other;
   a shaft that is rotatably supported at central axial positions of said first and second brackets;
   a rotor that is fixed to said shaft so as to be rotatably disposed inside said first and second brackets; and
   a stator comprising:
   a cylindrical stator core in which slots are arrayed circumferentially so as to be open on an inner circumferential side and that is disposed such that two axial end edge portions are pressed and held between opening edge portions of said first and second brackets so as to surround said rotor; and
   a stator coil that is wound onto said stator core,
   wherein:
   said stator core is configured into a cylindrical shape by abutting end surfaces of a laminated core with each other and integrating said abutted end surfaces by welding;
   said laminated core is configured by laminating a predetermined number of thin magnetic plates, at least two thin sheet coupling weld port ions that integrate said laminated predetermined number of thin magnetic plates by welding being formed so as to extend from a first end to a second end in a direction of lamination on an outer wall surface of said laminated core and so as to have a predetermined spacing; and
   said stator core is formed by plastically deforming the portions of said magnetic plates between said thin sheet coupling weld portions, such that an axial length A at said thin sheet coupling weld portions and a maximum axial length B between said thin sheet coupling weld portions satisfy an expression:

$0.0 \text{ mm} \leq B-A \leq (A/100) \text{ mm}$.

4. A dynamoelectric machine according to claim 3, wherein said laminated core is formed by bending into a cylindrical shape a rectangular parallelepiped lamination that is configured by laminating a predetermined number of sheets of said thin magnetic plates that are formed so as to have a flat rectangular shape.

* * * * *